Figure 1:
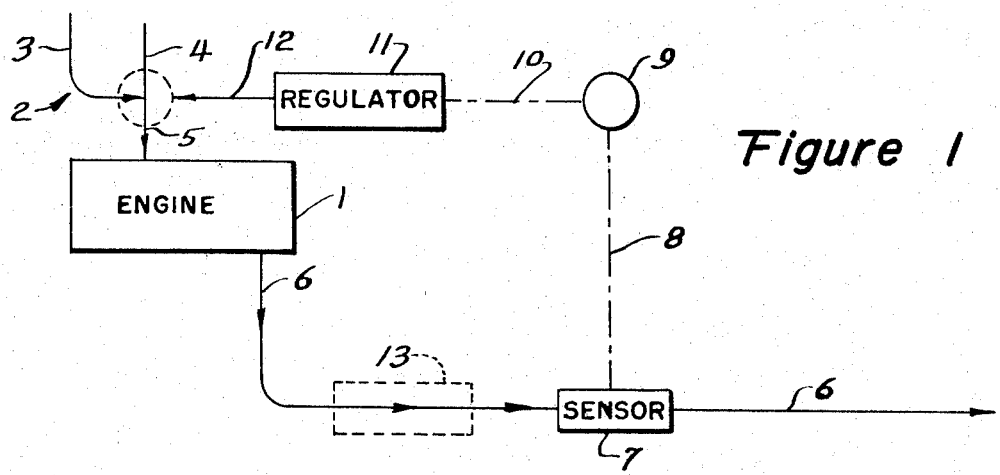

United States Patent [19]
Carnahan et al.

[11] 3,768,259
[45] Oct. 30, 1973

[54] CONTROL FOR AN ENGINE SYSTEM

[75] Inventors: Robert D. Carnahan, Barrington; Karl J. Youtsey, Chicago; David H. Spielberg, Schaumburg, all of Ill.

[73] Assignee: Universal Oil Products Company, Des Plaines, Ill.

[22] Filed: July 6, 1971

[21] Appl. No.: 159,936

[52] U.S. Cl............... 60/276, 60/285, 60/289, 204/1 T, 204/195 S
[51] Int. Cl..... F02b 75/10, F01n 3/14, G01n 27/46
[58] Field of Search............ 60/274, 276, 289, 60/285; 204/195 S, 1 T

[56] References Cited
UNITED STATES PATENTS

| | | | |
|---|---|---|---|
| 3,464,008 | 8/1969 | Meysson | 204/195 S |
| 3,578,578 | 5/1971 | Krusenstierna | 204/195 S |
| 3,607,701 | 9/1971 | Wheeler | 204/195 S |
| 2,807,930 | 10/1957 | Bratton | 60/300 |
| 3,032,969 | 5/1962 | Barnes | 60/276 |
| 3,441,381 | 4/1969 | Keith | 60/302 |
| 3,597,345 | 8/1971 | Hickam | 204/195 S |
| 3,616,274 | 10/1971 | Eddy | 204/195 S |

FOREIGN PATENTS OR APPLICATIONS

| | | | |
|---|---|---|---|
| 21,673 | 4/1961 | Germany | 204/195 S |

Primary Examiner—Douglas Hart
Attorney—James R. Hoatson, Jr. et al.

[57] ABSTRACT

A control system for an engine system which utilizes solid oxygen-ion electrolyte oxygen sensing means to generate an electrical signal responsive to the oxygen content of exhaust gases of the engine which in turn is used to control regulating means to vary the character of the exhaust gases issuing from the engine. In a preferred embodiment, the oxygen sensing means is disposed upstream from a catalytic reactor and this establishes means to control the nature of the gases entering such reactor in order to maximize the effect of said reactor. Specifically, the oxygen-ion electrolyte oxygen sensing means may comprise a first and second electrode means connected to the regulating means and spaced by a stabilized solid oxygen sensitive electrolyte, such as zirconia stabilized with calcia, with the first electrode means being in communication with the exhaust gases and the second electrode means being in communication with a reference gas such as atmospheric air.

10 Claims, 5 Drawing Figures

PATENTED OCT 30 1973

3,768,259

SHEET 2 OF 2

INVENTORS:
ROBERT D. CARNAHAN
KARL J. YOUTSEY
DAVID H. SPIELBERG

BY: James P. Hoolson, Jr.
Ronald H. Hauck
ATTORNEYS

CONTROL FOR AN ENGINE SYSTEM

The present invention relates to an improved engine system wherein fuel and air are admixed and combusted in an engine and the resulting exhaust gases issue therefrom. More particularly, the present invention relates to the method and means for controlling such an engine system, utilizing an electrical signal responsive to the oxygen content of exhuast gases issuing from the engine to establish a parameter for control. It is particularly directed to the use of a solid oxygen-ion electrolyte oxygen sensing means which is placed in communication with the exhaust gases of an engine system and which is used for generating an electrical signal responsive to the oxygen content of the exhuast gases. This signal in turn is used to control regulating means connected to the engine with the engine for regulating or varying the character of the exhaust gases issuing therefrom.

BACKGROUND OF THE INVENTION

In connection with the problem of reducing air pollution resulting from the automobile internal combustion engine, it is known that if the air to fuel ratio to the engine is maintained at or near stoichiometric conditions during most modes of operation the exhaust gases will contain less harmful components, i.e. hydrocarbons, carbon monoxide (CO) and oxides of nitrogen (NOx) which is of course desirable. Furthermore, if a reactor is installed in the exhaust line of an internal combustion engine it has been found that there can be a highly efficient conversion of these harmful components if suitable control of the exhaust gases prior to the reactor is maintained. This has been found to be especially true when a catalytic reactor is used in the exhaust gas stream. For example, test data indicates that best catalytic conversion results are obtained with the engine operating near the approximate stoichiometric air to fuel ratio. Moreover, even if the engine is not operating at an approximately stoichiometric air to fuel ratio, if the exhaust gases can be made to contain approximate stoichiometric quantities of air in relation to the hydrocarbon and CO combustibles, highly efficient catalytic conversion of all the noxious components, including the oxides of nitrogen, will take place in a catalytic converter located downstream of the engine. Actually, conversion of the oxides of nitrogen by many of the catalysts in present use has been optimum where the exhaust gases have a slightly reducing atmosphere (that is, i.e., high levels of hydrocarbons and CO present); however, on the other hand, where the air to fuel ratio to the converter is controlled, and there is little excess air to fuel, it appears that catalytic conversion becomes optimized and even residual oxides of nitrogen fall to a low level.

It is conceded that the measurement of oxygen pressure by utilizing a solid electrolyte is fairly well established. Reference is made to the following: U.S. Pat. Nos. 3,402,078, 3,359,188; 3,297,551; 3,378,478; 3,403,090; 3,347,767; 3,514,379; 3,400,054; and 3,442,773, for a rather thorough overview of the general state of the art. Reference is also made to the work of H. S. Spacil in Metal Progress Vol. 96 (5), 106 (1969) for an article on features and uses of solid-electrolyte oxygen sensors. We believe that the present invention is distinguished from the prior art in that it provides a novel method and means of controlling an engine system utilizing a solid stabilized electrolyte to generate a signal proportional to the oxygen content of the exhaust gases which in turn is used to control the engine system. It provides a closed loop system of control of the air/fuel ratio of exhuast gases which does not necessarily depend on the condition or mode of operation of the engine in the system.

SUMMARY OF THE INVENTION

It is a principal object of this invention to provide the means and method of operating an engine system which results in less harmful components being discharged to the atmosphere.

More particularly it is an object of this invention to provide the method and means of controlling an engine system which utilizes regulating means for regulating the character of exhaust gases and which utilizes a first solid oxygen-ion electrolyte oxygen sensing means in communication with the exhaust gases for generating an electrical signal responsive to the oxygen content of the exhaust gases and control means responsive to this electrical signal which controls the regulation of the character of exhaust gases.

Another object of this invention provides for a method and means of controlling the quality or character of the exhaust gases going into the reactor disposed in the exhaust line of an engine and which utilizes regulating means connected to the engine system for varying the character of exhaust gases to be passed to the reactor and a solid oxygen-ion electrolyte oxygen sensing means for generating an electrical signal responsive to the oxygen content of the exhaust gases going into the reactor and which utilizes control means for controlling the regulation of the character of exhuast gases which operates responsive to the electrical signal of the sensing means.

In one embodiment the present invention provides, in connection with an engine system wherein fuel and air are admixed and passed into an engine and resulting gases issue therefrom, a control system comprising in combination: (a) regulating means connected to said engine system for varying the character of exhuast gases issuing from the engine; (b) solid oxygen-ion electrolyte oxygen sensing means in communication with said exhaust gases for generating an electrical signal responsive to the oxygen content of said exhaust gases; and, (c) control means connected to said regulating means and to said oxygen sensing means for controlling said regulation means in response to said electrical signal.

In another embodiment the present invention provides, in connection with the operation of an engine wherein fuel and air are admixed and passed into an engine and resulting gases issue therefrom, a method of controlling the operation of said engine system which comprises in combination the steps of: (a) regulating the fuel to air ratio to said engine; (b) generating an electrical signal responsive to the oxygen content of said exhaust gases with a stabilized solid oxygen sensitive electrolyte placed in communication with the exhaust gases and with a reference gas; and, (c) controlling the regulation of the fuel to air ratio in response to said electrical signal.

The solid oxygen-ion electrolyte oxygen sensing means will preferably comprise first and second electrode means connected to the regulating means and spaced by a stabilized solid oxygen sensitive electrolyte. One of the electrode means will communicate with exhaust gases, and the other will communicate with a reference gas which for the most simplified and preferred embodiment will comprise atmospheric air.

Preferably the solid electrolyte will comprise a solid solution of ionically conductive oxides. The oxides of the tetravalent elements zirconium, thorium, and hafnium have been found to be excellent electrolytes. We have stabilized their structure with oxides of elements such as calcium, barium, strontium, ytterbium, lanthanum, scandium, and samarium. Other elements selected from the group consisting of elements which form cations with stable +2 and +3 valences in the oxide may also be used as a stabilizing media. The stabilizing oxide may be used in amounts from about 10 mole to about 20 mole percent of the total solution depending on the practical internal resistance that can be tolerated.

Because the electrolyte also acts as a thermocouple, i.e., it produces a potential which varies with the temperature of the electrolyte, in a preferred embodiment means is provided to compensate for this electrical activity due to thermal variances of the exhaust gases.

In a preferred embodiment a reactor is placed in the exhaust line of the engine and the exhaust gases are passed through a reactor to be treated. In such an arrangement it is sometimes desirous to regulate the air to fuel ratio of the engine to regulate the character of exhaust gases which are to be introduced to the reactor. This may be accomplished by controlling the choking, by controlling the pressure in the float bowl, by injecting additional air into the manifold of the engine, and/or by injection addition of fuel into the manifold of the engine, and the like. It is also contemplated to control the character of the exhaust gases to be introduced to the reactor by introducing secondary air into the exhaust gases prior to the reactor and/or by introducing secondary fuel into the exhaust gases prior to the reactor. It may be considered to be within the scope of this invention to only control one variable to thus regulate the character of exhaust gases, i.e., either the air or fuel can be controlled. On the other hand, considered without the controls of this invention, if the air to fuel ratio to the engine was maintained on the lean side of stoichiometric conditions, it would only be necessary to add fuel to maintain the exhaust gases near stoichiometric conditions, and, conversely, if the input to the engine is maintained on the rick side of stoichiometric conditions without the controls of this invention then only secondary air need be added to obtain stoichiometric exhaust gas conditions.

It should be mentioned that the reactor to be utilized in connection with this invention is preferably of catalytic type. In the catalytic operation, the hot gases issuing from the engine exhaust manifold are passed through a catalytic bed or conversion zone maintained within a housing, so as to effect a more or less complete oxidation of the carbon monoxide, the unburned hydrocarbons, as well as the reduction of the oxides of nitrogen to a harmless state. The catalytic operation is preferred since it is capable of oxidizing and reducing the components of the exhaust gases at generally lower temperature than would be otherwise possible. Also catalytic operations are generally flameless.

Although the present invention is directed mainly to utilizing the oxygen content of exhaust gases to control the engine system, it should be considered within the scope of this present invention to provide other parameters of control used in combination with the oxygen sensor. Of course other parameters are always used to control the engine itself and by necessity must be overriding. In other words, the desired speed will necessarily be a parameter of operation and a throttle will have to control the amount of fuel and air to be introduced into the engine. The present invention is directed to controlling either the proportion of the air to fuel to be introduced into the engine automatically by trimming the supply to stoichiometric amounts or optimum amounts in relation to pollutants in the exhaust or in controlling the exhaust gases by means of introducing secondary air and/or secondary fuel downstream of the engine which will have little effect itself on engine operation.

Reference to the accompanying drawing and the following description thereof will serve to further illustrate and describe the present invention, as well as to set forth variations as to arrangements and scope. Additional advantageous features with respect to this invention will also be set forth in connection with the description of the accompanying drawings.

FIG. 1 of the drawing is a schematical block diagram of one embodiment of the engine system of this invention.

Figure 2:
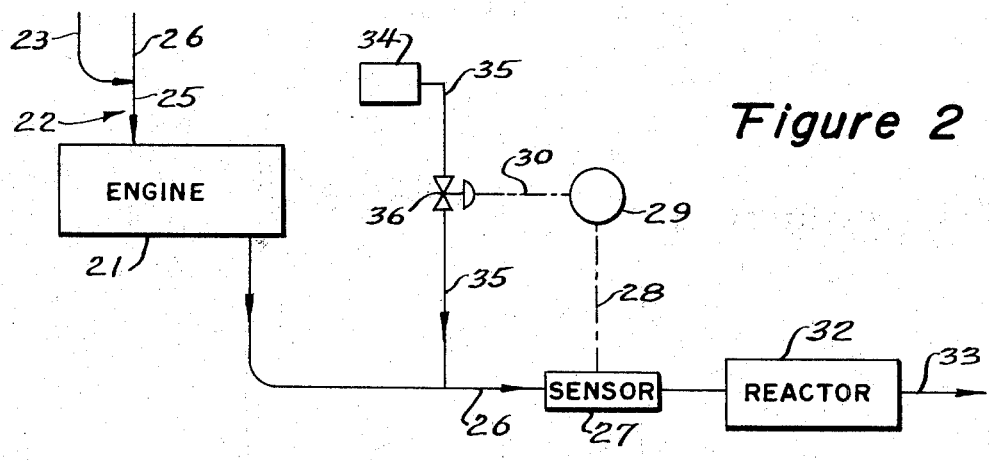

FIG. 2 of the drawing is a schematical block diagram of another embodiment of the present invention.

Figure 3:
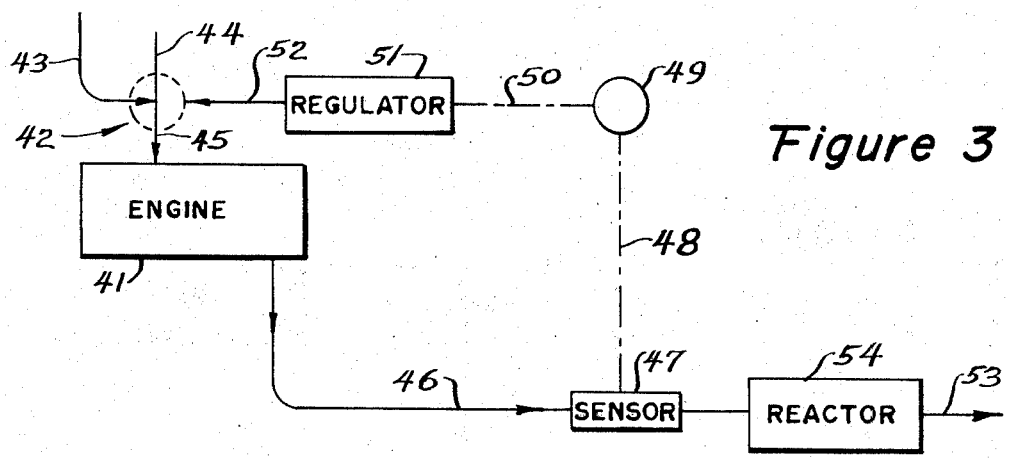

FIG. 3 of the drawing is a schematical block diagram of a third embodiment of the present invention.

Figure 4:
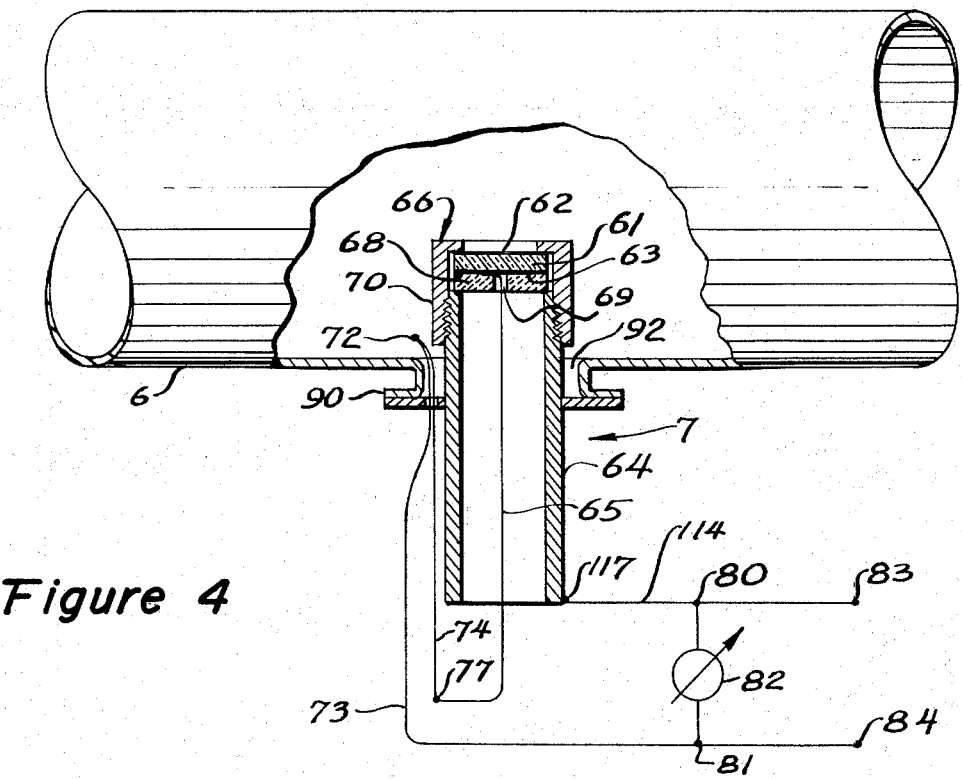

FIG. 4 of the drawing is a sectional view of the oxygen sensor utilized in this invention.

Figure 4A:
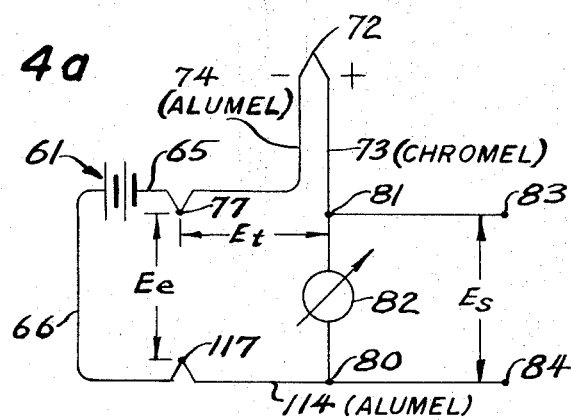

FIG. 4a of the drawing is a schematical wiring diagram of the sensor of FIG. 4a.

Referring particularly to FIG. 1 of the drawing, there is shown schematically an engine 1 having fuel and air inlet means 2. The air and fuel may be brought in via lines 3 and 4 respectively and admixed and passed into the engine through line 5. The inlet means may be comprised of a traditional carburetor system with float bowl, a fuel and air injection system, a traditional carburetor system with supercharged air or the like. The exhaust gases issue from the engine through exhaust line 6 and discharge to the atmosphere. The invention is directed to a control system for such an engine system. Such a control system will comprise a regulation means 11 which in the embodiment of FIG. 1 is connected to the air and fuel inlet means schematically via line 12. The regulating means is used to vary the character of exhuast gases issuing from the engine by regulating the air to fuel ratio to the engine. In other words, regulator 11 may comprise fuel jets, air jets, mechanical means to control the choke, pressure regulating means to control the pressure of a float bowl of a conventional carburetor or the like. By controlling one or more of the above mentioned items, the character of the input to the engine may be varied and thus the character of the exhaust gases will vary. In communication with the exhuast gases in line 6 there is supplied a sensor 7 which includes a solid oxygen-ion electrolyte and which generates an electrical signal responsive to the oxygen content of the exhaust gases in line 6.

Reference is made to FIGS. 4 and 4a of the drawing where the details of sensor 7 are shown. First referring to FIG. 4 there is shown a conduit 6 of FIG. 1. In conduit 6 there is provided an opening 92 having a flanged portion 90 which provides access and attachment means whereby the sensor 7 may be attached to and inserted into conduit 6. The sensor comprises a stabilized solid oxygen sensitive electrolyte 61 which is spaced between two gold electrodes 62 and 63. The gold electrodes act as charge collector electrodes and are in communication with the conducting electrolyte holder 66 on the exhaust gas side of the electrolyte and a conducting lead 65 on the reference air side of the electrolyte which is preferably like material as the electrolyte holder 66. Conductor 65 contacts the gold electrode 63 via air opening 69 in a porous ceramic section 68. Lead 65 is maintained in pressure tight contact against the electrode 63 via internally threaded portion 70 which is attached to the conducting tube 64 which is preferably like material as the electrolyte holder 66. The inside of the tube 64 defines an open chamber of greater volume than the displacement volume of the electrolyte 61, and thus electrode 63 is in communication with atmospheric air which serves as a reference gas. By utilizing atmospheric air as a reference gas in this embodiment, it is not intended to limit such use for a sealed reservoir of reference gas is also contemplated to be within the scope of this invention. The conductive electrolyte holder 66, formed by the conductive screw cap 70 and the conducting tube 64 is connected to a terminal 80 via lead 114. (Reference should also be made to FIG. 4a for a schematical diagram of the wiring.) Lead 65 is connected to a terminal 77. The magnitude of the voltage $E_e$ between terminals 80 and 77 will be dependent on the amount of oxygen present in the reference gas and in conduit 6. It will also depend on the thermocouple effect or conductivity effect of the electrolyte 61. To eliminate the thermocouple effect of element 61 compensating means or compensating thermocouple 72 is placed in close proximity to the sensor so as to be at the same temperature as the electrolyte.

To be operative the change in voltage per centigrade degree of thermocouple 72 should be substantially the same as that for electrolyte 61. This may be accomplished by utilizing the same material for the thermocouple as was used for the electrolyte. In the alternative we have found that by employing a chromel-alumel thermocouple adequate results were obtained when utilizing zirconium stabilized with calcia as the electrolyte 61. The thermocouple characteristic for the chromel-alumel is approximately equal to 0.04 millivolts per degree centigrade. The use of any particular type of thermocouple or combination or grouping of thermocouples will depend on the particular electrolyte employed and the particular thermocouple characteristics thereof and the range of oxygen partial pressure being monitored. The thermocouple is put in series with the electrolyte circuit and is connected via line 74 to terminal 77 via line 73 to a terminal 81. An additional external voltage may be introduced to establish a suitable high temperature reference voltage for the thermal compensating thermocouple network. A potentiometer 82 which serves as a voltage or *emf* converter is disposed between terminals 80 and 81. By utilizing a potentiometer for an *emf* converter it is not intended to be limiting upon this present invention for other *emf* converters are contemplated for use herein. The one requirement which overrides all other requirements is that the *emf* converter should have a high input impedance. By having a high input impedance, the current passing through the electrolyte and through thermocouple will be negligible; thus, the voltage Es between terminals 80 and 81 will not be dependent upon current flowing through the electrolyte. The thermocouple circuit of course is put into series with the electrolyte circuit so as to have an opposite polarity voltage Et between terminals 77 and 81 than the polarity of voltage due to the thermocouple effect of the electrolyte. When utilizing chromel-alumel as the thermocouple, lead 74 would be the alumel lead and lead 73 would be the chromel lead. To cancel the thermocouple effects of the connection between the alumel lead 74 and lead 65 (at terminal 77) lead 114 is also preferably an alumel lead. In effect then, the voltage will cancel out any portion of the voltage $E_e$ which is due to thermal variations within the electrolyte. The terminals 80 and 81 are connected via suitable lines to terminals 83 and 84 which may be connected should the controller of the system. Of course, it shouod be recognized by those skilled in the art that many modifications in the design of sensor 7 may be made without departing from the concept of the invention.

The galvanic cell voltage (without the thermocouple) may be calculated using the following equation:

$$E_e = V \log \frac{(PO_2)\ I}{(PO_2)\ II}$$

where the subscripts *I* and *II* refer to the reference side and the exhaust side of the electrolyte respectively, $v$ is a constant, in volts which varies with the temperature of the electrolyte, and $P_{o2}$ refers to the partial pressure of oxygen on the respective sides of the electrolyte.

Among the requiremetns for the solid electrolyte 61 is that it have a high ratio of ionic conductivity to electronic conductivity. This is necessary so that the potential difference between the electrodes is not reduced by the diffusion of electrons. Cation conductivity must be very low to prevent destruction of the electrode-electrolyte interface. Furthermore, the electrode 61 must act as a barrier to the exhaust gases and to reference gas so that direct reaction of the components in the exhaust gas with the oxygen present in the atmosphere is unlikely to occur.

The material making up the solid electrolyte 61 will preferably comprise a solid solution of oxides having a high degree of oxygen ion conductivity compared with either electronic conductivity or cation conductivity. As set out hereinbefore, the oxides of the tetravelent elements of zirconium, thorium and hafnium have been found to establish excellent electrolytes for use with the present invention. The oxides of these elements are preferably stabilized with the elements which form cations with stable +2 and +3 valences in the oxide over an appreciable range of conditions. The stabilizing oxide may be used in amounts from about 1/2 weight percent to about 30 weight percent of the total solution. Examples of elements which are suitable for the stabilizing oxide are: calcium, barium, strontium, yttrium, lanthanum, scandium, ytterbium, and samarium which form the oxides $CaO$, $BaO$, $SrO$, $Y_2O_3$, $La_2O_1$, $Sc_2O_3$, $Yb_2O_3$, and $Sm_2O_3$, respectively. The first three oxides being of elements of Group II–A and the remaining five oxides being of elements of Group III–B of the Periodic Table as shown on pages 448 and 449 of the Handbook of Chemistry and Physics, 44th edition, and published by Chemical Rubber Publishing Company of Cleveland, Ohio. It should be particularly noted that mixtures of the designated oxides, both those making up the electrolyte oxide and those making up the stabilizing oxide may be used in this invention.

The optimum mole percent of the stabilizing oxide is that for which the electrolyte element resistivity is lowest and conduction is by oxygen ions. Present information indicates this optimum value is 12 mole percent to about 20 mole percent for zirconia stabilized with calcia.

Conductivity studies to date indicate this optimum value varies for different stabilizing oxides. For example, the work of Strickler and Carlson, reported in part in J. Am. Ceram. Soc., 48, 286 to 289, June 1965, indicates that the maximum conductivity of some binary mixed oxide compositions, wherein the solid electrolyte is zirconia, occurs near the cubic-monoclinic phase boundary. The following table indicates the following optimum values for some stabilizing oxides utilized with zirconia:

| Stabilizing oxide | % Mole of total solution |
|---|---|
| $Sc_2O_3$ | 6 |
| $Yb_2O_3$ | 7 |
| $Y_2O_3$ | 9 |
| $Sm_2O_3$ | 10 |

It also appears from present information that conductivity is greater for compositions where the optimum value is small compared with compositions where the optimum value is large. The stablizing oxide not only increases the ionic conduction of the structure, but it also tends to place the structure in a stabilized cubic or distorted cubic phase especially when utilizing zirconia or hafnia. Thoria naturally occurs in the cubic form without an additional stabilizing oxide.

The solid electrolyte 61 preferably has a thickness of about 1.5 mm or less. It is not desirable for the electrolyte to be thicker because the internal resistance then becomes too great. The electrolyte should be as thin as can be fabricated, consistent with necessary mechanical strength and ability to permit only oxygen ions to pass through it. To prevent diffusion of molecular gases through the electrolyte, it is also necessary that the material be relatively dense or at least have no interconnecting pores.

The electrolyte material is selected for its high ratio of ionic conductivity to electronic conductivity, a high ratio of oxygen to cation conductivity and its chemical stability. By cation conductivity is meant the conductivity of the positive ions of the elements in solution. It has been found that at relatively high temperatures the above materials have considerably greater ionic than electronic conductivity and the ionic conductivity is relatively high. For example, experiments with 85 mole percent zirconia and 15 mole percent calcia at 1,000° C have shown that this ionic conductivity comprises more than 99 percent of the total conductivity.

The high oxygen ion conduction in structures of this type is believed to result in the following manner, which is presented merely by way of explanation, since an understanding of the conduction process is not essential to the practice of the invention. Considering zirconia stabilized with calcia as an example. All of the Ca+ ions entering the lattice replace $Zr^{+4}$ ions in the lattice. An equivalent number of oxygen vacancies are thereby formed in the oxygen lattice in order to preserve electrical neutrality of the crystal. The oxygen vacancies are distributed throughout the lattice and hence provide a path for oxygen ion migration.

It has been found suitable to employ an electrolyte having a fluorite-like crystal structure. However, other crystalline structures such as pyrochlorite may well be used. Material suitable for use as the solid electrolyte is commercially available and methods of making it are well known. For example, $(ZrO_2)$ $(CaO)$, commonly known as calcia stabilized zirconia is widely available in dense forms for the general uses of a ceramic material. The electrolyte should be substantially free of impurities which may increase the electronic and cationic conductivity of it.

The ionic conductivity is found to be temperature dependent and is greater at high temperatures. Accordingly, it is desirable to operate at high temperatures, particularly about 700° F and above for use in exhaust gas sensing. At extreme high temperatures certain factors become significant which offset the increase in conductivity. One of these factors is the chemical stability of the electrodes which imposes a practical high temperature limit of about 1,200° C.

The selection of suitable electrodes or charge collectos 62 and 63 must be done carefully to ensure good low resistance contact to the electrolyte, high temperature chemical stability, sufficient conductivity, porosity and a coefficient of thermal expansion compatible with the solid electrolyte 61.

Although we have utilized gold as the electrode material, other materials have been found to be suitable. Among the electrode materials which have been found suitable is a mixture of nickel and platinum formed by placing nickel pellets of minute size wetted with chloroplatinic acid solution in contact with the electrolyte and heating to about 1,100° C. A mixed metal oxide such as lanthanum nickel oxide or calcium lanthanum manganese oxide may well be used. Such an electrode may be made by spraying with a plasma jet. One or more metals of the platinum group comprising platinum, palladium, rhodium, and iridium, and their alloys are also suitable for use as either of the electrodes 62 and 63. Methods of forming such a layer of such material suitable for use as an electrode are well known. For example, a paste comprising the powdered metal, such as platinum, in an organic binder can be applied to the electrolyte and heated to remove the binder and fuse the platinum to the electrolyte. It of course simplifies the fabrication procedure if the electrodes 62 and 63 are each of the same material, such as those of the platinum group. Furthermore, such a symmetrical arrangement makes it possible to reverse the electrolyte. We have used gold as the electrode since its use permits mechanical attachment to the electrolyte as describd hereinbefore.

Referring now to FIG. 1 again it is seen that the voltage signal from sensor 7 is transmitted via a line 8 to controller 9. The controller 9 may be any of the control devices known in the art which are utilized to control valves, blowers, and the like which in turn will vary float bowl pressure, the choke setting of the carburetor, the amount of air to be injected into the engine, the amount of fuel to be injected into the engine or other devices which will form part of regulator 11. The controller is in turn connected to the regulator 11 via transmitting line 10. The regulator may comprise such valving means, blower means, pumping means or injection means to be used to regulate or turn the air to fuel ratio to the engine. The present invention should not be limited to any one particular form of regulation means as there are many contemplated. The important aspect of the embodiment of FIG. 1 is that the controller may be set at a particular set point voltage which corresponds to a certain level of oxygen in the exhaust gases. Preferably, the desired level of oxygen in the exhaust gases should correspond to approximate stoichiometric conditions in the combustion chambers of the engine, but it is also contemplated to set the voltage to levels which would correspond to other than stoichiometric conditions, if it is found that less pollutants will result in the exhaust gases.

The magnitude of the output signal from the sensor 7 depends on the partial pressure of oxygen in the exhaust gas. A voltage deflection range of 10 to 200 millivolts has been found to cover most case ranges of partial pressure. As the engine is operated, the oxygen in the exhaust gases generates a voltage signal $E_s$ which is transmitted to the controller which is preset with a predetermined set point voltage. The controller which is preferably a proportional controller will cause the regulation means 11 to either introduce additional air and/or introduce additional fuel to ultimately regulate the character of the exhaust gases about the desired oxygen concentration thereof.

Reference is made to FIG. 2 of the drawing where a block diagram of an alternative form of engine system is shown. There is shown an engine 21 having fuel air inlet means 22 comprising an air inlet 23 and fuel inlet 26 with a mixing section 25 and which may be a conventional carburetor or the like. Connected to the engine is exhaust conduit 26 which serves as a discharge conduit for the exhaust gases from the engine. A reactor 32 is placed in the exhaust line 26 for converting harmful components of the exhaust gases to generally harmless ones. The treated exhaust gases are discharged from the converter via conduit 33. The reactor 32 is preferably of a catalytic type which has been found to convert exhaust gases at relatively low temperatures. Sensor 27 is placed in the exhaust line 26 upstream from the reactor and it is preferably of the type illustrated in FIG. 4 of the drawing. The sensor is connected to a controller 29 via a suitable transmitting line 28 and the controller in turn is connected to a valve means 36 via line 30 which may be operated via pneumatic mechanical or electrical means. Valve 36 is used to control flow through line 35 which is connected ahead of the reactor to line 26. Supply means 34 is connected to the conduit 35 and is used for supplying secondary air and/or secondary fuel. The set point of oxygen content for the controller is preferably set at a condition where the greatest proportion of harmful components of the reactor are converted to harmless components. By empirical analysis a set point for the controller may be determined to optimize the conversion of the harmful components, i.e., cabon monoxide, hydrocarbons, and oxides of nitrogen.

Reference is now made to FIG. 3 of the drawing where another embodiment of the invention is shown utilizing schematical block diagrams. There is shown an engine 41 with air fuel inlet means 42 comprising an air inlet 43, a fuel inlet 44 and a mixing zone or manifold 45. Connected to the engine 41 is an exhaust pipe 46 and a reactor 52 connected to the exhaust pipe. The treated exhaust gases from the reactor 52 are discharged through line 53 to the atmosphere. The sensing device 47 which again is preferably of the form shown in FIG. 4 is connected upstream of the reactor 52 and in communication with the untreated exhaust gases. The sensor 47 is connected through a suitable transmitting means 48 to a controller 49 which in turn is connected to the regulator 51 via line 50. As was the case in FIG. 1, regulator 51 is connected to the air inlet means via suitable means 52 and may comprise valving, pumps, or blowers which may be utilized to vary the air to fuel ratio to the engine. The set point of the controller is preferably set so that the optimum conversion of harmful components in the exhaust gases 46 takes place within the reactor 52.

It is not intended to limit the present invention to the three embodiments as disclosed in the drawing. For example, it is contemplated in the embodiment of FIG. 1 to utilize a converter 13 upstream of the sensor 7 without utilizing a sensor upstream of the reactor. We have found that if we can maintain relatively stable approximate stoichiometric conditions prior to a converter by analyzing the output gas of the reactor itself and regulating the input to the converter in response to the oxygen partial pressure downstream of the converter. Furthermore, configurations of sensors may be employed without departing from the scope of the invention. The diagrams are not shown to any particular scale, and are schematical representation. It should be apparent to those skilled in the art that modifications in the design of the sensor can be made without departing from the scope of the invention.

Example 1

A catalytic converter containing a bed of copper-iron alumina catalyst was disposed in the exhaust pipe of a standing engine. A sensor similar in configuration to that shown in FIG. 4 was disposed downstream of the converter and a secondary air pump was used to regulate the input to the converter. The electrolyte was $(ZrO_2)$ 0.85 $(CaO)$ 0.15. The pump was controlled by a proportional controller whose set point was determined for maximum conversion, and which controlled the pump in response to a voltage signal from the sensor. The engine was operated through seven modes including idle, acceleration, deceleration and 30 mph cruise. At idle, carbon monoxide input was five percent and at 30 mph cruise it was three percent of total throughput. Without utilizing the sensor to control secondary air and utilizing constant secondary air of 15 psi over atmospheric, conversion equaled 15 percent CO, 10 percent hydrocarbons and 50 percent of nitrogen. Utilizing the sensor, the conversion results were 90 percent CO, 90 percent hydrocarbons and 90 percent oxides of nitrogen

We claim as our invention:

1. In an engine system wherein fuel and air are admixed and passed into an engine and resulting exhaust gases issue therefrom, a control system comprising in combination:

a. regulating means connected to said engine system for varying the character of exhaust gases issuing therefrom;

b. an oxygen sensing means for generating an electrical voltage signal in response to the concentration of oxygen in said exhaust gases when aaid exhaust gases are at a temperature of at least about 700° F, said oxygen sensing means comprising a hollow tubular conductive body mounted in the exhaust path of said engine so that the length of the portion of the body which extends into the exhaust path is less than one half the inside width of the exhaust path where the body is mounted, first and second electrode means affixed to first and second sides of a wafer of oxygen sensitive stabilized solid electrolyte mounted in said tubular body, at least one of said electrode means comprising a lead extending from said wafer and through the hollow portion of said tubular body, the first side of said wafer being in communication with the exhaust gases to be sensed and the second side of said wafer being in communication with a reference gas contained in an open chamber within said hollow tubular body, said open chamber being defined on its sides by said hollow tubular body, said open chamber having a volume greater than the displacement volume of the said electrolyte wafer, said tubular body and wafer being mounted within said exhaust path so that the exhaust gases will impinge on the wafer side of said tubular body and will flow parallel to the said first side of said wafer, said wafer being heated to said temperature of at least about 700° F solely by the exhaust gases being sensed;

c. control means connected to said regulating means and to said oxygen sensing means for controlling said regulation means in response to said electrical signal.

2. The engine system of claim 1 wherein said solid electrolyte comprises stabilized zirconia.

3. The engine system of claim 1 wherein said oxygen sensing means includes temperature compensating means connected to said electrode means for compensating for thermal variations of electrical activity of said electrolyte.

4. The engine system of claim 3 wherein said temperature compensating means comprises a thermopile placed in bucking series with said electrodes.

5. The engine system of claim 1 wherein said engine system includes a catalytic reactor for treating said exhaust gases, said oxygen sensing means being mounted in said exhaust path downstream from said catalytic converter.

6. An oxygen sensing device for generating an electrical voltage signal in response to the concentration of oxygen in the exhaust gases in an exhaust conduit of an internal combustion engine when said gases are at a temperature of at least about 700° F, said sensing device comprising a tubular, hollow conductive body; means for mounting one end of said tubular body in an opening in the exhaust conduit of said internal combustion engine so that its sides are in the path of the exhaust gases following substituted so that the length of the portion of the body which extends into the exhaust path is less than one half the inside width of the exhaust path where the body is mounted, a wafer of oxygen sensitive, stabilized solid electrolyte; means for sealing said wafer in the said one end of said tubular body, said wafer being sufficiently dense to prevent the passage of gases therethrough; first and second electrode means affixed to the inner and outer surfaces, respectively, of said wafer; said first and second electrode means having lead ends attached thereto, said lead means being accessible at the end of said oxygen sensing device which is remote from said wafer; said wafer being mounte in said tubular body so as to be adapted to be exposed in an exhaust conduit to a flow of exhuast gases to be sensed across its outer surface; said inner surface of said wafer being adapted to be exposed to an oxygen containing reference gas contained in an open chamber inside said hollow tubular body, said open chamber being defined on its sides by said hollow tubular body, said open chamber having a volume greater than the displacement volume of the solid electrolyte wafer, said wafer being adapted to be heated during use to a temperature of at least about 700°) F, solely by the heat of the exhaust gases being sensed; the difference in oxygen partial pressures to which the inner and outer surfaces of said wafer are exposed when heated causing an electrical voltage to be developed between said electrodes.

7. The oxygen sensing device of claim 6 wherein said electrolyte is stabilized zirconia.

8. The oxygen sensing device of claim 6 wherein said oxygen sensing means includes temperature compensating means for compensating for variations in the voltage generated between said electrodes due to variations in the temperature of the exhaust gases.

9. The oxygen sensing device of claim 8 wherein said temperature compensation means comprises a thermally activated voltage generating means for generating a bucking voltage.

10. The oxygen sensing device of claim 9 wherein said bucking voltage is produced by a thermopile placed in bucking series with said electrodes.

* * * * *